(No Model.) 8 Sheets—Sheet 3.

F. F. RAYMOND, 2d.
HEEL NAILING MACHINE.

No. 347,062. Patented Aug. 10, 1886.

Figure 3:
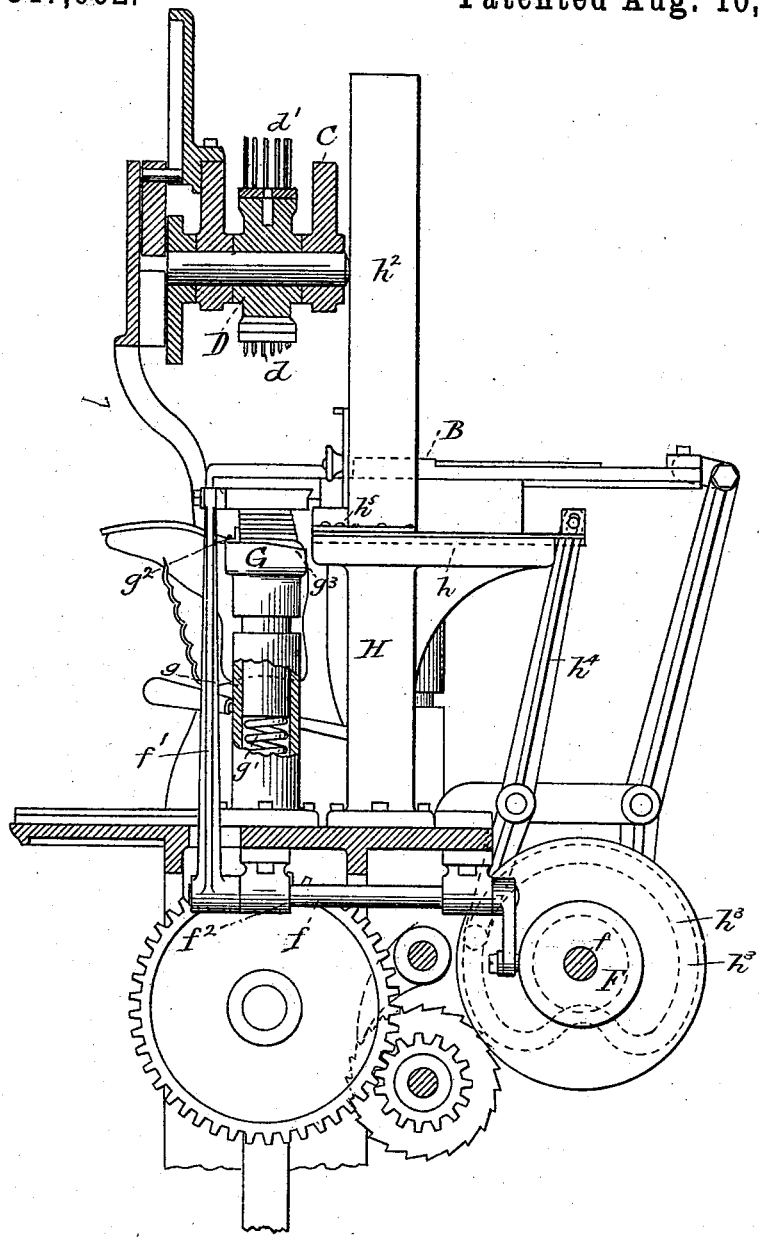

WITNESSES. Fig. 3. INVENTOR.

(No Model.)

F. F. RAYMOND, 2d.
HEEL NAILING MACHINE.

No. 347,062. Patented Aug. 10, 1886.

WITNESSES.
J. M. Dolan.
Fred. B. Dolan.

INVENTOR.
F. F. Raymond 2d.

(No Model.)  F. F. RAYMOND, 2d.  8 Sheets—Sheet 5.

HEEL NAILING MACHINE.

No. 347,062.  Patented Aug. 10, 1886.

WITNESSES

INVENTOR (No Model.)

F. F. RAYMOND, 2d.

HEEL NAILING MACHINE.

No. 347,062.  Patented Aug. 10, 1886.

8 Sheets—Sheet 6.

WITNESSES.

INVENTOR.

(No Model.)

F. F. RAYMOND, 2d.

8 Sheets—Sheet 7.

HEEL NAILING MACHINE.

No. 347,062.

Patented Aug. 10, 1886.

WITNESSES

INVENTOR (No Model.)  F. F. RAYMOND, 2d.  8 Sheets—Sheet 8.
HEEL NAILING MACHINE.

No. 347,062.  Patented Aug. 10, 1886.

WITNESSES.
J. M. Dolan
Fred B. Dolan

INVENTOR.
F. F. Raymond

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 347,062, dated August 10, 1886.

Application filed May 29, 1885. Serial No. 167,047. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification in explaining its nature.

The object of the invention is to provide means for automatically feeding heel blanks and top-lifts to a position to be automatically attached to the boot or shoe, and to the heel-blank, respectively.

The invention comprises a plate which carries or supports at one end appliances for holding a heel-blank, and at the other end appliances or devices for holding a top-lift, which plate is adapted to be reciprocated to bring, first, the heel-blank into position over the boot or shoe, and beneath the nail-driving devices, and then to bring the top-lift into position over the attached heel-blank. The movement of this plate to bring the heel-blank and top-lift successively into position also brings the heel-blank-holding devices and the top-lift-holding devices successively into position, the first or heel-blank-holding appliance before a device for automatically feeding heel-blanks thereto, and the second or top-lift-holding appliance before a device for automatically feeding top-lifts thereto.

In the drawings I have represented my invention as applied to a "National Heel Nailing Machine."

Figure 1:
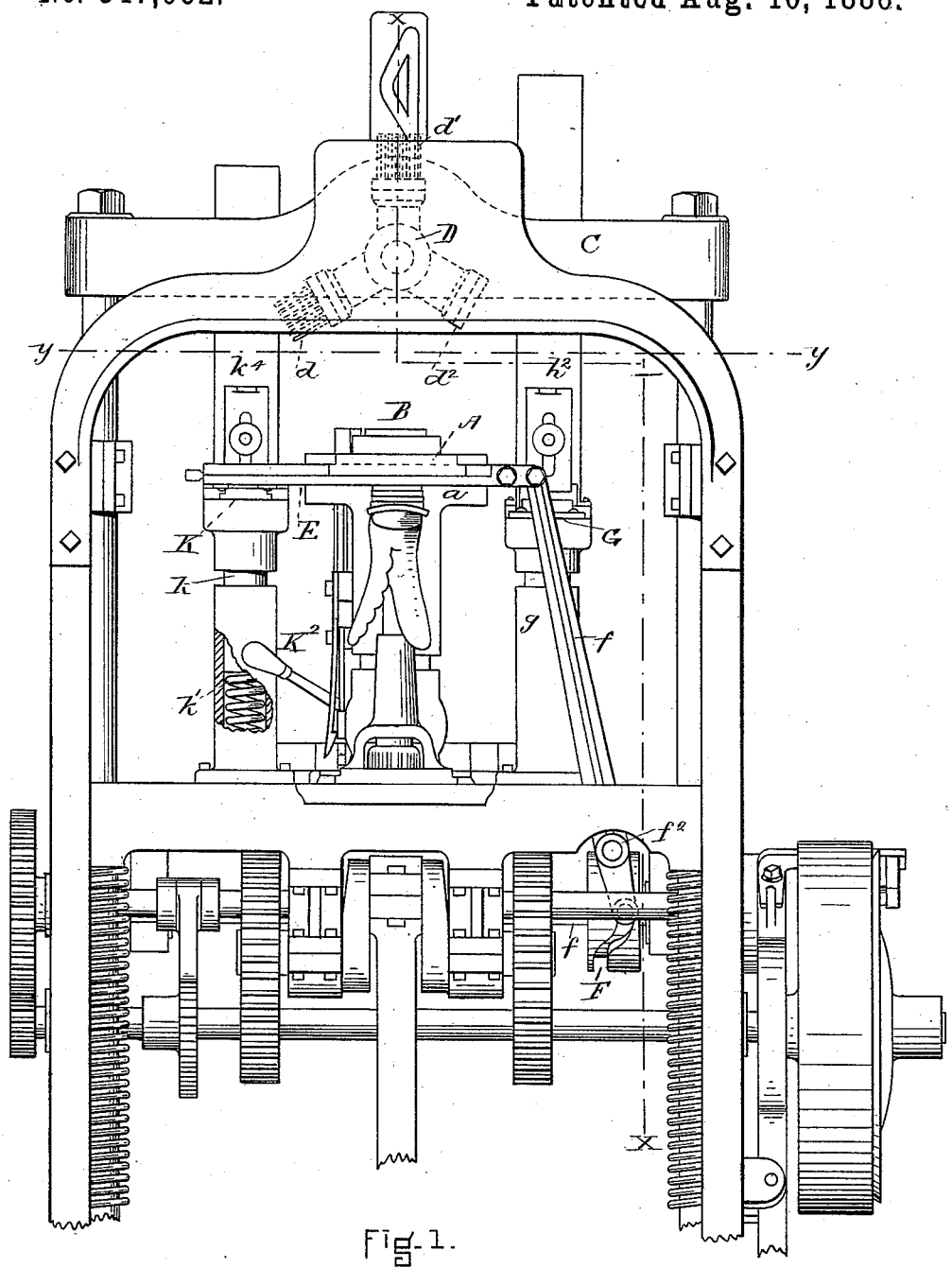
Figure 2:
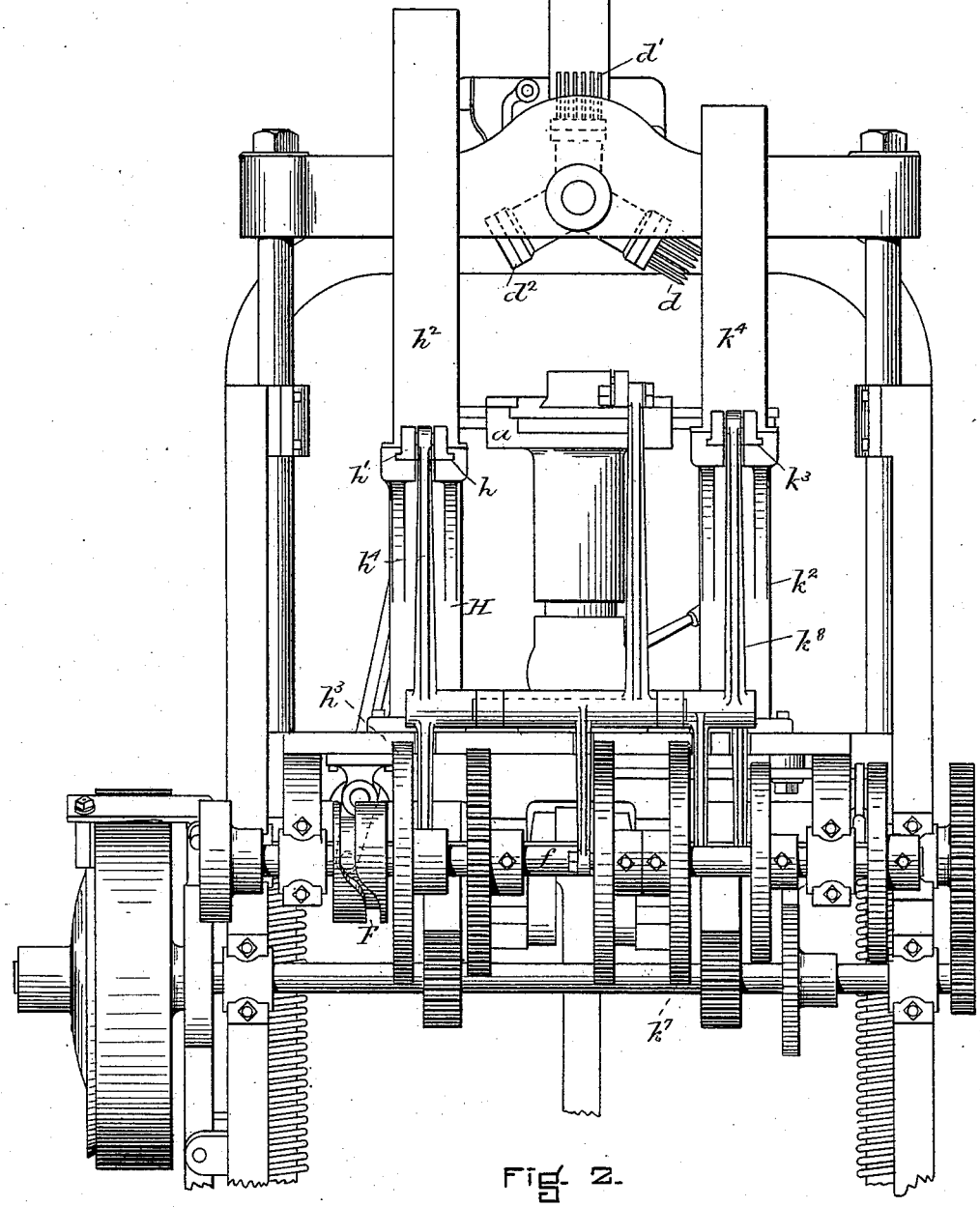
Figure 4:
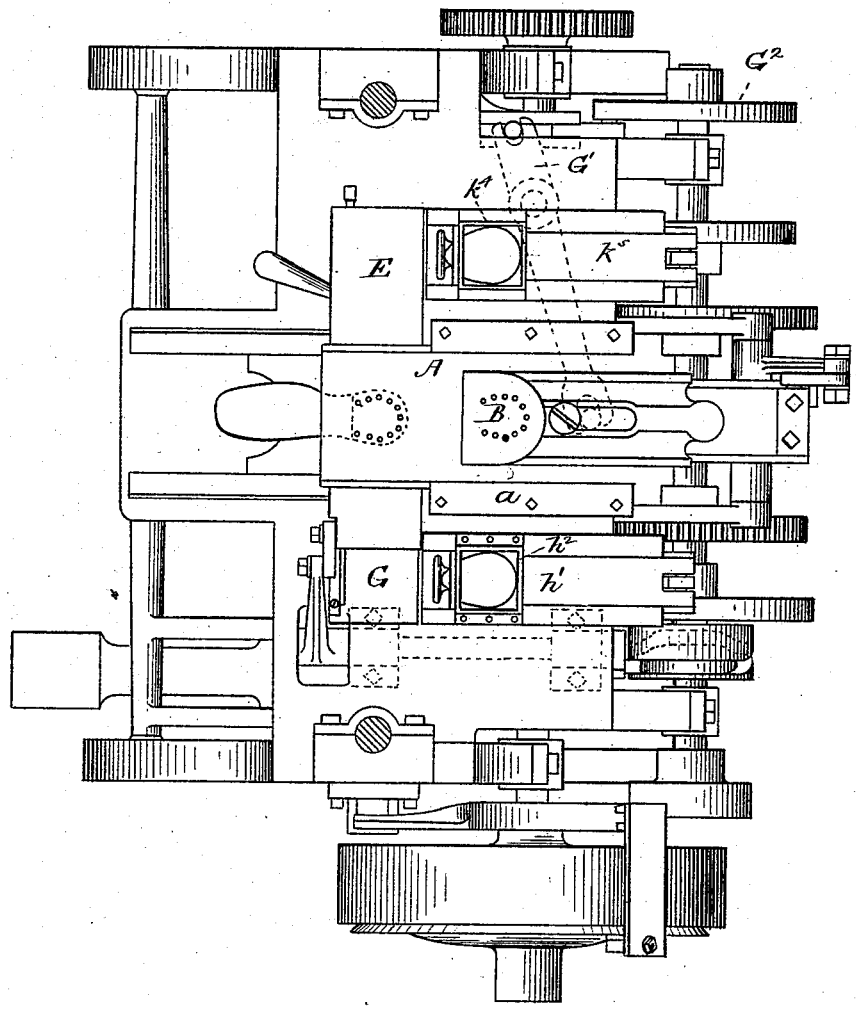
Figure 5:
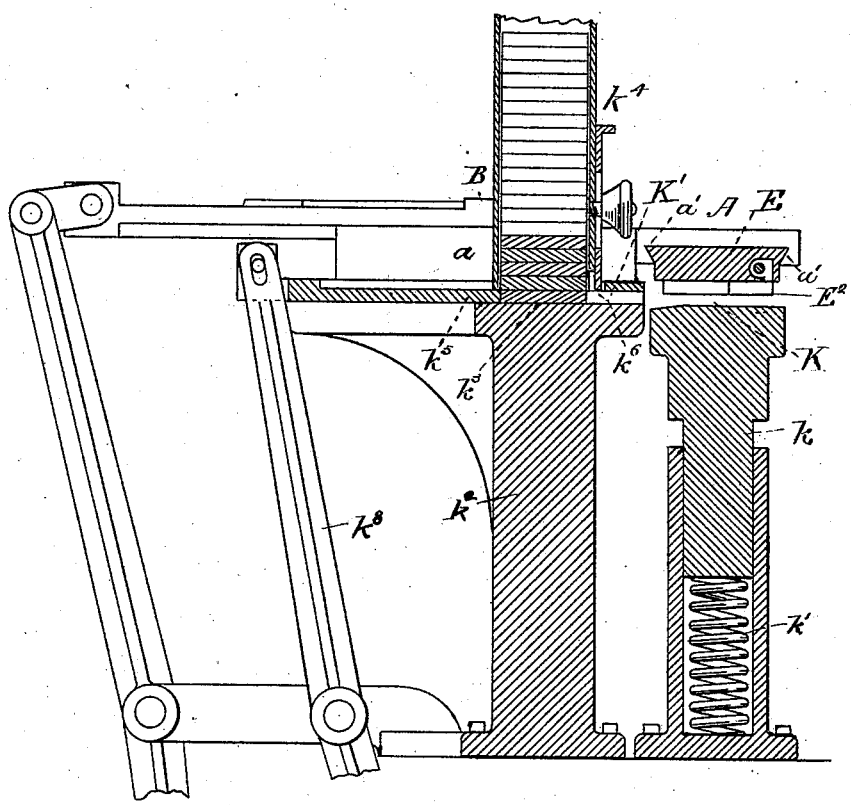
Figure 10:
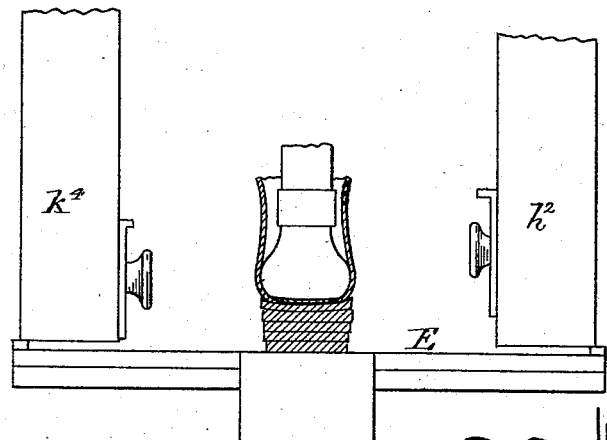
Figure 6:
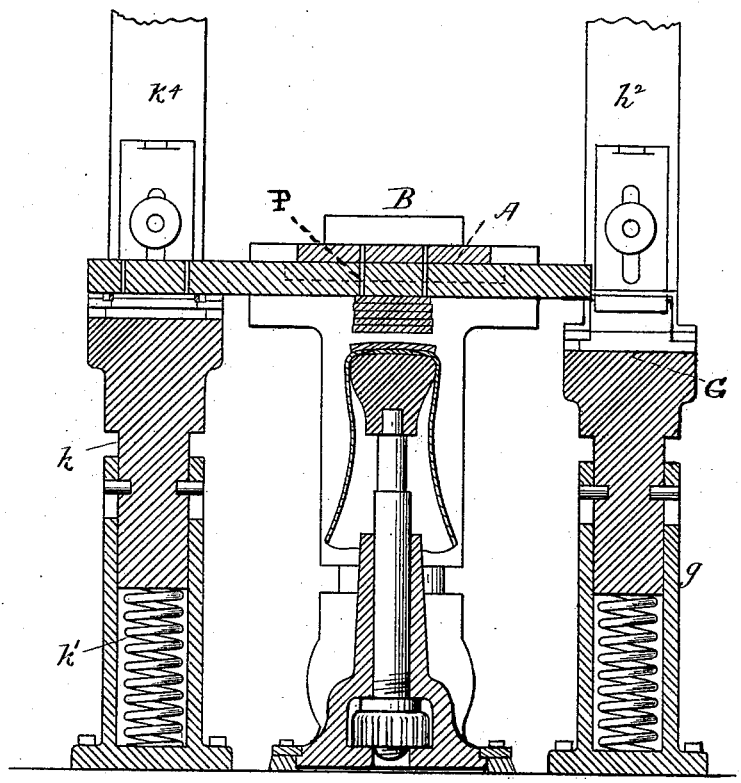
Figure 7:
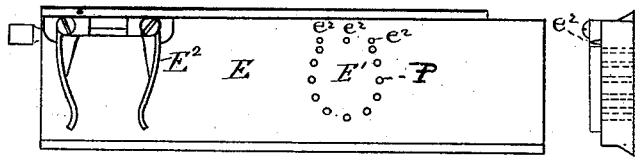
Figure 8:
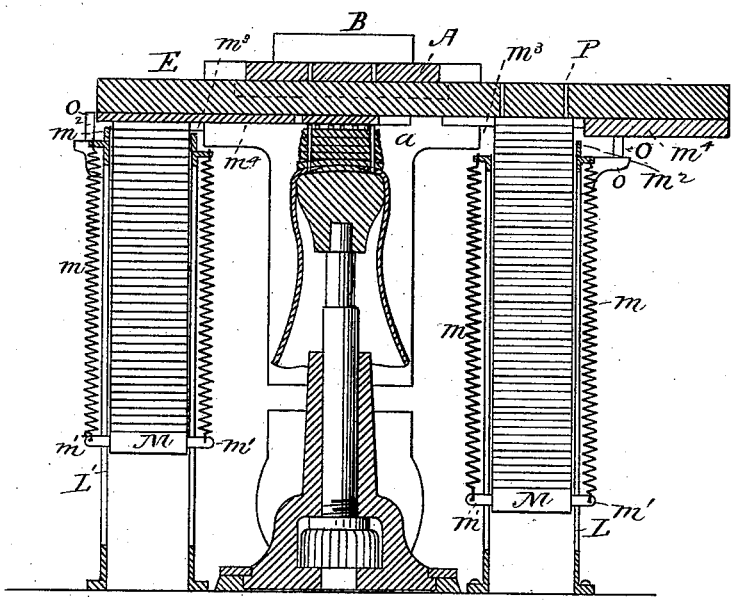
Figure 7:
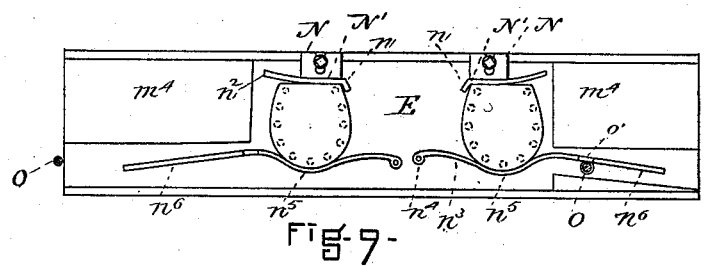
Figure 14:
Figure 11:
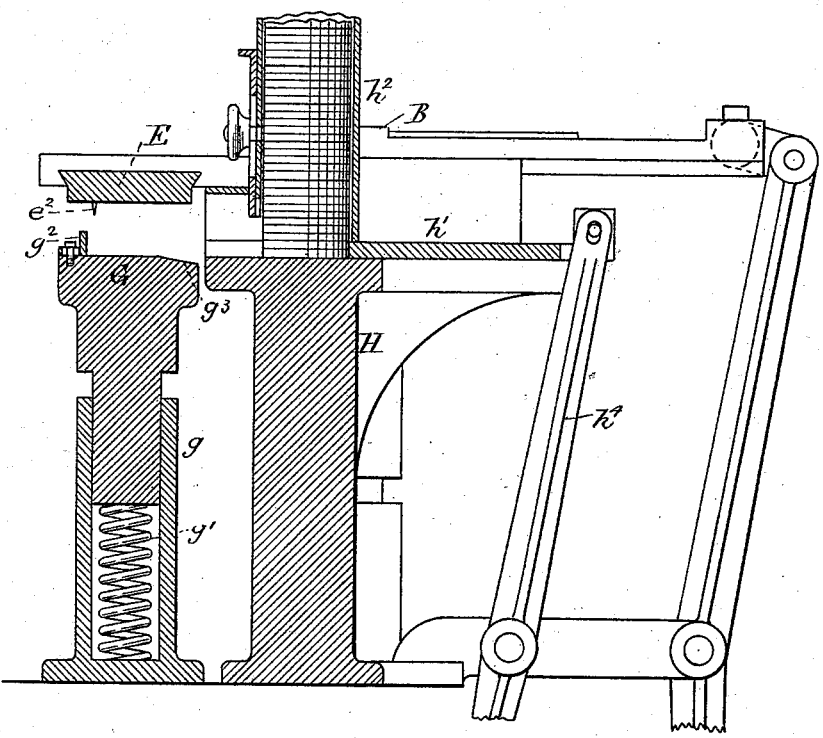
Figure 12:
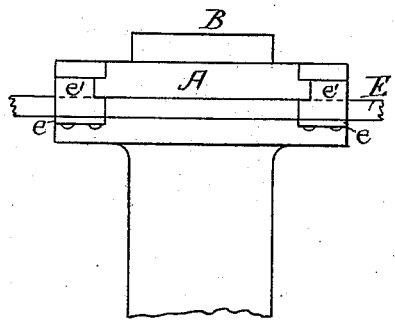
Figure 13:
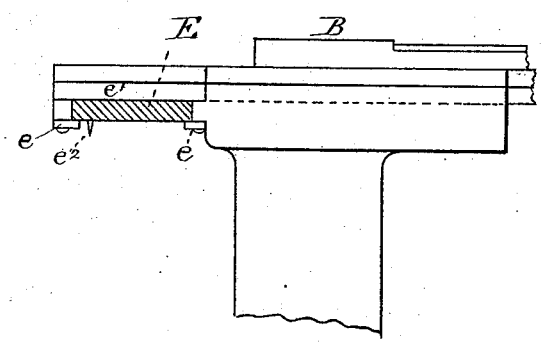

Figure 1 represents a view, in front elevation, of the central upper part of an improved "National Heel Nailing Machine containing" the features of my invention. Fig. 2 is a rear elevation of the same portions of the machine. Fig. 3 is a view, part in elevation and part in vertical section, upon and back of the line $x\, x$ of Fig. 1. Fig. 4 is a plan view below the line $y\, y$ of Fig. 1. Fig. 5 is a vertical central section, enlarged, of the top-lift feeding device hereinafter described. Fig 6 is a view in vertical section showing the heel-blank and top-lift-carrying plate, and the relation which it bears to the templet and to the heel-blank and top-lift feeding devices. Fig. 7 is a plan view of the carrier-plate inverted. Fig. 8 is a view in vertical section illustrating a modification hereinafter specified. Fig. 9 is a view, inverted, of the heel-blank and top-lift carrier plate. Fig. 10 shows the application of the invention to machines in which the boot or shoe is held above the templet or pressure plate, instead of below it. Fig. 11 is a vertical central section of the heel-blank-feeding devices. Figs. 12 and 13 illustrate the top-lift and heel-blank carrier plate as supported by the carriage, instead of by the templet-plate. Fig. 14 is a perspective view of a part of the heel-blank and top-lift-holding devices hereinafter described.

The heel-nailing devices are substantially like those described in the Henderson and Raymond patents, numbered, respectively, Reissue 10,588, Reissue 10,589, Nos. 290,109, 316,894, and 317,647, and I will but briefly enumerate them here.

A is the templet. It is shown as stationary in most of the figures; but it may be moved into and out of position by hand, or automatically, as may be desired; and when automatically I prefer to use the mechanism described in my Patent No. 290,109.

B is the nail-carrier, which transfers the nails from a position where they can readily be fed to the carrier, either by hand or by an automatic nail-feeding device, to a position over the templet, and from which they are driven. Both the templet and nail-holder are supported by the vertically-movable carriage $a$.

C is the cross-head. It is reciprocated as described in the said Henderson Patents Nos. 10,589 and 316,894, and it carries a revolving head, D, which supports a gang or group of awls, $d$, a gang or group of drivers, $d'$, and a spanker-block, $d^2$.

Arranged on a line with a portion of the templet-plate, or immediately below it, is the plate E. This plate is supported in the dovetail recess $a'$, formed in the lower surface of the templet-plate A, or it is independently supported by the carriage $a$, as shown in Figs. 12 and 13, and when so supported it is adapted to be moved in the guide-passages $e$, formed therein. The plate E is adapted to carry or support the heel-blank-holding device E' and the top-lift-holding device $E^2$, and any suitable or desirable appliances for these purposes may be employed. I have shown as one means of holding the heel-blank the spurs $e^2$. The top-lift-holding devices are like those described in the Henderson Patent No. 316,894. The plate E is moved at intervals by means of the cam F of the cam-shaft $f$ and the rock-lever $f'$, pivoted at $f^2$, as hereinafter specified.

Arranged to be in line with the heel-blank-holding device on the plate E, when the plate has been moved to bring the top-lift into position for attachment to the heel-blank, is the bed G, which, preferably, is supported in its bracket or post $g$, to yield or move downwardly against the pressure of the coil-spring $g'$. This table G also has the gage-plate $g^2$, which is horizontally adjustable upon the bed G. The rear surface, $g^3$, of the bed is somewhat inclined, as shown in Fig. 3. Behind this bed G is a bracket or post, which has a bed, $h$, upon which is reciprocated the heel-blank-feeding plate $h'$ across the lower portion of the box $h^2$ for holding a stack of heel-blanks. This plate $h'$ is reciprocated by means of the cam $h^3$ upon the cam-shaft, and the lever $h^4$, which is timed, as hereinafter specified. There is formed in the bed the opening $h^5$ in the box $h^2$, through which the heel-blanks are ejected or moved upon the table or bed G. There is also arranged to be opposite the top-lift-holding devices $E^2$, when the heel-blank is moved into position to be attached to the boot or shoe, a bed, K, which is similar to the bed G. It is supported by the post $k$, and is vertically-movable downward against the pressure of the spring $k'$. Behind this table there is a post, $k^2$, which has the bed $k^3$, and which supports the box $k^4$, holding a stack of top-lifts. The top-lift-feeding plate $k^5$ is arranged to be moved upon the bed $k^3$ across the lower portion or bottom of the box $k^4$, and there is an opening, $k^6$, in said box, through which the top lifts are successively moved by the top-lift-feeding plate. From this passage to the bed K there extends a covered way, K', through which the top-lifts are moved to the surfaces of the bed K by the top-lift-feeding plate $k^5$. This feeding-plate is reciprocated by means of the cam $k^7$ upon the cam-shaft of the machine and the lever $k^8$.

We will suppose that the machine is about to be operated. The operator places the boot or shoe upon the work-support or jack, and it is moved into position beneath the templet, the heel-blank having previously been moved into position by the plate E. The operator then with the handle or lever $K^2$ moves the templet and the heel supported thereby down upon the heel end of the boot or shoe, and the machine is then set in operation and the awls driven into the heel-blank, the templet moved downward to compress the heel-blank and locked, the nails fed by the nail-carrier and driven by the reciprocating drivers. The templet-plate is then unlocked, preferably as described in my application filed April 25, 1885, Serial No. 163,440, and rising, leaves the heel-blank attached to the sole of the boot or shoe. The plate E is then moved by its cam and lever, bringing the heel-blank-holding devices or prongs over the bed G, upon which there is a heel-blank which has previously been automatically fed by the reciprocation of the plate $h'$. The movement of the plate E to bring the heel-blank-holding devices over the bed G brings the top lift which is held by the top-lift-attaching arms, and which has been fed automatically thereto by the top-lift-feeding plate $k^5$, into position for attachment to the heel-blank. Upon the next reciprocation of the machine the spanker-block $d^2$ comes down upon the templet-plate A, if it has not been withdrawn, or upon the plate E, if the templet-plate has been withdrawn, and the top-lift is spanked upon the heel-blank, the plate E be moved downward. Upon this downward movement of the plate E the spurs for holding the heel-blank are driven into the upper lift of the blank, the table G at the same time yielding downward after the spurs have been driven in, if there should be a necessity for it. Upon the upward movement of the spanker-block the plate E is automatically moved to bring the heel-blank into operative position for attachment to the next boot or shoe in order, the previously-attached heel and its shoe being moved out of position with the jack or work-support by means of a cam, $G^2$, and a lever, G', connected with the jack and operated as described in my application for patent filed May 6, 1885, Serial No. 164,552. This brings the top-lift-holding devices opposite the top-lift-feeding device, but the top-lift is not then fed by the top-lift-feeding device, as the time within which said feeding can take place would of course be very limited. It is therefore desirable that the top-lift be fed during the reciprocation of the awls and drivers, and after the templet-plate A has been moved down and locked upon the heel-blank; and I have therefore arranged the bed K and the bed $k^3$ of the top-lift-feeding device so that they shall be in line when the plate E has been moved downward to its lowest position, and while it is so held the top-lift-feeding plate $k^5$ is reciprocated to feed the top-lift.

Of course, in lieu of feeding the heel-blanks and top-lifts from the bottom of a stack of blanks, they can be fed from the top of a stack, and when this is desirable I prefer to arrange the blanks and lifts in boxes so arranged that the respective heel-blank and top-lift-feeding plates are caused to reciprocate across the upper end thereof, and when the boxes are so arranged it is necessary to provide each of them with a lifting-diaphragm, which shall move the top-lifts and heel-blanks upward.

In lieu of arranging the stacks of heel-blanks and top-lifts as above specified, they may be arranged to take the place of the beds G K and their supports, as represented in Fig. 8, in which case L represents the box holding the heel-blanks, and L' the box holding the top-lifts. Each box has a diaphragm, M, which is moved upwardly by means of the springs $m$, attached to arms $m'$, projecting outwardly from the diaphragm through long slots formed in the boxes. With this form of construction the carrier-plate E will take the heel-blank and top-lift, substantially as above indicated—that is, the movement of the plate will be the same. The heel-blank and top-lift-holding devices will be somewhat different, and they will each comprise the gage-plate N, laterally adjustable upon the plate E by means of a slot and screw, or in any other desirable way. This plate supports at its edge the gage $N'$, which has the stop or shoulder $n$, the straight portion $n'$, and the outwardly curved or extended portion $n^2$. There is also attached to the plate E, to form a portion of each of the said holding devices, the spring-arm $n^3$, which is pivoted at $n^4$, and has the curve $n^5$ and outwardly-extending section $n^6$.

It will be seen upon inspection of Fig. 9 that the sections $n^2$ $n^6$ of each of the holding devices form, as it were, an entrance to the holding device, and that as the plate E is moved in one direction or the other they are caused to close upon either the heel-blank or top-lift, and the spring $n^6$ is moved back by contact with a pin, hereinafter described, or with the edge of the heel-blank or top-lift, sufficiently to allow the passage of the plate until the curved portions $n^5$ of the springs come opposite the back of the heel-blank or top-lift.

In order that the heel-blank and top-lift may be held stationary during the movement of plate E in taking a heel-blank or top-lift, I have extended the side $m^2$ of each box upwardly, so that it acts as a stop to prevent the plate E from dragging or moving the blank or top-lift while it is being operated to take either one or the other. In order, however, that the heel-blank or top-lift may be fed or moved from the stack of blanks into a position to be driven, it is necessary that each box should have the mouth or outlet $m^3$ of sufficient size to allow of the passage of but one heel-blank or top-lift at a time, so that but one heel-blank or top-lift will be moved from its respective stack upon the operation of the plate E, and into position for attachment. As, however, the heel-blanks and top-lift immediately rise after one has been removed, it is necessary to prevent their rising sufficiently to be in line with the opening $m^3$ of the box during the feeding motion of the plate E; and in order to prevent this I have formed upon the plate E the downward-extending portions $m^4$, which are so placed that upon the movement of the plate E to remove the heel-blank or top-lift this section immediately takes the place of the blank removed, so that the blanks cannot be forced up by the springs sufficiently to escape through the holes or outlets $m^3$. Upon the reverse movement of the plate E these sections or portions of the plate pass beyond the box, as represented at the right hand of Fig. 8, and allow the blank to be forced or moved upward. In order, however, that the blank may be lifted so that its upper surface shall be brought into proper contact with the under surface of the plate E, I have arranged to extend out from the edge of each blank a bracket or arm, $o$, for holding the pin O. This pin is so arranged in relation to the end $n^6$ of the spring-arm $n^3$ that upon the movement of the plate E to take the blank the under surface of the arm comes in contact with the pin, and the spring is moved outward and held outward until, by the continued movement of the plate E, the hole $o'$ in the spring is brought in line with the pin, when, of course, the spring moves over it and closes upon the back end of the blank; and it is during the interval that the spring is thus held in contact that the portion $m^4$ leaves the box, and the heel-blank or top-lift, as the case may be, forced or moved upward.

I may use, in lieu of the springs for lifting the diaphragm N, a cord and weight, or any mechanical equivalent for the device herein described.

The blanks are placed in their respective boxes through openings formed therein. The size of the opening $m^3$ of each stack may be varied in size by a movable plate, as described in my said application filed May 6, 1885, Serial No. 164,552.

When the carrier-plate E is supported by the table, as above described, and as shown in Figs. 12 and 13, the templet-plate may be moved automatically into and out of operative position, if desired.

Of course it will be necessary to provide the carrier-plate E with holes, through which the awls may be reciprocated into the heel-blank and the nails driven; but the portion of the plate adapted to carry the top-lift-holding devices is not perforated.

In the drawings, P represents the perforations or holes in the heel-blank-carrying part of the plate E. These holes may be considerably larger than those in the templet-plate, making it unnecessary to as nicely construct and fit the parts as would be the case if the holes were of the same size.

The heel-blank and top-lift devices are herein shown as applied to the "National Heel Nailing Machine," or containing the elements of said "National" machine; but I do not wish to be understood as limiting them to such use, as they may be used in connection with any heel-attaching device; and in Fig. 10 I have represented the device as applied to a machine in which the heels and top-lift are attached to the boot or shoe held in an upright position above the templet or pressure plate. In this case, however, the heel-blank and top-lift, instead of being suspended from the under surface of the plate, will be borne or carried upon the upper surface thereof.

I would state that I do not confine myself to the specific form of heel-blank and top-lift holding devices herein specified, but may use appliances of equivalent construction in lieu thereof; also, the carrier-plate E may be operated in any other manner or by any other equivalent means.

I prefer that the gage-plate $g^2$ be made horizontally adjustable upon its bed G by means of a slot formed in the plate and a fastening bolt or screw, or by any other desirable means. The machine is arranged to make three successive reciprocations automatically and then stop; and in operation the operator moves the jack or work-support to a position under the heel-blank which was fed into position while the heel previously attached was being moved out of position, and during the last half reciprocation of the cross-head. The operator, by the handle $K^2$, may then move the carriage $a$, and all that it supports, which of course includes the templet or pressure-plate A, and the carrier-plate E downward to bring the heel-blank upon the outsole before the machine is set in operation, although this movement is not essential, as the machine can be started without so doing. Upon the starting of the machine the awls are driven into the heel-blank and the heel-blank compressed, and the templet or pressure-plate A, with the carriage $a$, locked down automatically, so that the heel-blank is held compressed during the movement of the cross-head C, away from the templet or pressure-plate. The drivers are then brought automatically into position, the nails automatically fed to the templet-plate, and the machine makes another reciprocation and drives the nails into the heel and soles, clinching their ends upon the iron surface or support. The cross-head then lifts again, the table $a$ is unlocked and lifted by its spring, and the plate E is moved by the cam F to bring the top-lift into position for attachment to the heel-blank. The machine then makes another reciprocation, the spanker-block comes down upon the pressure-plate A, or, if that is withdrawn, upon the plate E, and the plate is depressed, spanking the top-lift upon the heel-blank. The carriage is then unlatched again by the operating-cam, which is substantially like that described in my said application filed May 6, 1885, Serial No. 164,552, and is lifted to its original position, and the jack or heel-support is immediately moved out of operative position, while the plate E, which has already received a heel-blank, is moved to bring the next heel-blank for attachment into place, so that upon the stopping of the machine this heel-blank is in position to be attached to the next boot or shoe placed in the machine.

The plate E carries or takes a heel-blank during the downward movement of the plate in spanking on the top-lift when the heel-blank-holding devices compose the prongs or spurs $e^2$. When the devices shown in Fig. 9 are used, then it takes the heel-blank upon its outward movement to bring the top lift into operative position. The top-lift is fed to the top-lift-holding device immediately after the driving of the awls, or while the table $a$ is held locked down. The top-lift-holding devices are then opposite the top-lift-feeding devices, and immediately over the bed K and the yielding arms of the top-lift-holding device, (shown in Fig. 7,) so that they act to guide the top-lift as the top-lift-plate feeds the blank from the stack to a proper position between the arms described. Of course the yielding bed K holds the top-lift up against the surface of the plate E while it is being forced between the yielding arms of the holder. The heel-blank-feeding-plate $h'$ and the top-lift-feeding-plate $k^3$ may have means for varying their length for the purpose of making the adjustments necessary in feeding longer or shorter heel-blanks and top-lifts, and as this may be accomplished in so many ways I have considered it unnecessary to further describe it here. I would simply say, however, that perhaps the best form of such construction is to interpose between the working or front edge of the plates and the ends of the operating-levers a spring take-up, which will permit the further movement of the levers after the heel-blanks and top-lifts have been fed to the proper position by the plates, so that the plates may always be set to move forward the greatest distance necessary, and, by the yielding of the springs automatically, accommodate themselves to the blanks and top-lifts, which shall require that their front or working edges be not moved so far.

It is not essential that the heel-blanks be fed into position upon the last half-reciprocation of the cross-head C, as it may be fed into position immediately upon the starting of the machine; but this time of movement I consider not as preferable. It is not necessary that the jack or work-support be moved out of operative position automatically upon the last half-reciprocation of the cross-head C, if the heel-blank is fed upon a line or level above the upper edge of the attached heel-blank, so as to clear it.

The cam for automatically unlatching or unlocking the carriage $a$, to which reference has already been made, is shaped to operate the unlatching-lever immediately after the driving of the nails, and also immediately after the spanking of the top-lift.

It is obvious that the plate E may take the place of the templet or pressure plate A. In other words, if desired, the templet or pressure plate A may be dispensed with, in which case the nail-carrier B would feed the attaching-nails directly to the holes formed in said plate E.

The devices for revolving the head automatically are described in Patent No. 317,647.

Having thus fully described my invention, I claim and desire to secure by Letters Patent of the United States—

1. The combination of the reciprocating plate E, having the top-lift-carrying devices, the bed K, the box $k^4$, for holding a stack of top-lifts, and the reciprocating plate $k^5$, all substantially as and for the purposes described.

2. The combination, in a heel-nailing machine, of a box for holding heel-blanks in stack, a box for holding top-lifts in stack, heel-attaching and top-lift-spanking devices, and transferring devices, substantially as specified, for transferring from said stack of heel-blanks and said stack of top-lifts, in successive order, a heel-blank and a top-lift into position for attachment to the boot or shoe, substantially as and for the purposes described.

3. The combination, in a heel-attaching machine, of a box for holding a stack of heel-blanks, a box for holding a stack of top-lifts, a templet-plate, and a reciprocating gang of nail-drivers, with a carrier-plate, E, having at one end heel-blank-grasping devices and at the other end top-lift-grasping devices, and means, substantially as specified, for feeding heel-blanks and top-lifts from their respective stacks to said heel-blank and top-lift-grasping devices, substantially as described.

4. The combination, in a heel-nailing machine, of heel-attaching and top-lift-spanking devices, a heel-blank-feeding device, substantially as specified, for automatically feeding heel-blanks to the heel-attaching mechanism, and devices, substantially as specified, for automatically feeding top-lifts to the top-lift spanker, all substantially as described.

5. The combination, in a heel-nailing machine, of the templet or pressure plate A, a heel-blank-carrying device arranged upon one side of the templet-plate, and a top-lift-feeding device arranged upon the other side of the templet-plate, the said heel-blank-carrying device and said top-lift-carrying device being adapted to be moved across the templet to bring a heel-blank and top-lift successively into position for attachment to the boot or shoe.

6. In a heel-nailing machine, the combination of the templet A, the nail-driving devices, the plate E, adapted to be moved across the templet from one side thereof when in operative position, the cam F, and the lever $f$, substantially as described.

7. The combination, in a heel-nailing machine, of the templet A, the nail-driving devices, the plate E, adapted to be moved across the templet, when the templet is in operative position, heel-blank-grasping devices supported at one end of said plate E, top-lift-grasping devices supported at the other end of said plate E, the heel-blank-holder G, and the top-lift-holder K, the heel-blank-feeding plate $h'$, and the top-lift-feeding plate $k^5$, and means, substantially as specified, for reciprocating them, substantially as described.

8. In a heel-nailing machine, the combination of the templet or pressure plate A, the heel-nailing devices, the heel-blank carrier-plate E, carrying heel-blank-grasping devices, and means, substantially as specified, for moving the plate across the templet when the same is in operative position, a box, $h^2$, for holding heel-blanks in stack, a plate, $h'$, a cam, $h^3$, connected therewith and adapted to reciprocate the same, and a heel-support or bed, G, all substantially as described.

9. The combination, in a heel-nailing machine, of the templet or pressure plate A and nail-driving devices, the carrier-plate E, having top-lift-grasping devices, the bed or support K, the box $k^4$, for holding top-lifts in stack, the top-lift-feeding plate $k^3$, and means, substantially as specified, for moving the transferring-plate E and the top-lift-feeding plate $k^3$, substantially as described.

10. The combination, in a heel-nailing machine, of the templet or pressure plate A, the plate E, carrying heel-blank-grasping devices, and having perforations or holes through which the attaching-nails may be driven from the templet, and devices, substantially as specified, for moving the said plate across the line of the templet or pressure plate when or while the same is in operative position, substantially as described.

11. The combination, in a heel-attaching machine, of the vertically-movable carriage $a$, the plate E, movable transversely of the carriage by means substantially as specified, locking devices for automatically locking the carriage in a depressed position, and devices, substantially as specified, for automatically unlocking the carriage, all substantially as and for the purposes described.

FREEBORN F. RAYMOND, 2D.

Witnesses:
J. M. DOLAN,
FRED. B. DOLAN.